United States Patent [19]

Hassler et al.

[11] Patent Number: 4,704,679

[45] Date of Patent: Nov. 3, 1987

[54] ADDRESSING ENVIRONMENT STORAGE FOR ACCESSING A STACK-ORIENTED MEMORY

[75] Inventors: Joseph A. Hassler; Gregory K. Deal, both of W. Chester, Pa.

[73] Assignee: Burroughs Corporation, Detroit, Mich.

[21] Appl. No.: 743,377

[22] Filed: Jun. 11, 1985

[51] Int. Cl.[4] .......................... G06F 12/02; G06F 13/00
[52] U.S. Cl. ..................................................... 364/200
[58] Field of Search ... 364/200 MS File, 900 MS File

[56] References Cited

U.S. PATENT DOCUMENTS

| 3,461,434 | 8/1969 | Barton et al. | 364/200 |
|---|---|---|---|
| 3,546,677 | 12/1970 | Barton et al. | 364/200 |
| 3,548,384 | 12/1970 | Barton et al. | 364/200 |
| 3,737,871 | 6/1973 | Katzman | 364/200 |
| 3,868,644 | 2/1975 | Healey et al. | 364/200 |
| 3,889,243 | 6/1975 | Drimak | 364/200 |
| 4,268,903 | 5/1981 | Miki et al. | 364/200 |
| 4,366,536 | 12/1982 | Kohn | 364/200 |
| 4,471,431 | 9/1984 | Vogt | 364/200 |
| 4,517,640 | 5/1985 | Hattori et al. | 364/200 |

Primary Examiner—Archie E. Williams, Jr.
Assistant Examiner—William G. Niessen
Attorney, Agent, or Firm—Mervyn L. Young

[57] ABSTRACT

An address environment storage unit for a stack-oriented data processor for operating in data sets arranged as structured blocks, or nested pushdown stacks. The address environment storage employs a plurality of sets of display registers such that the current set of display registers does not have to be updated each time the processor moves to a different area of data in memory. The programmer only needs to provide a designation of a lexical level in a particular stack and the offset value from the base of the particular activation record in that stack for addition to obtain actual memory address. When the processor executes a procedure enter operator that calls for a new section of memory in which to operate, a display pointer is changed to point to the set of display registers provided for accessing that new area of memory.

6 Claims, 9 Drawing Figures

BEFORE ENTR

AFTER ENTR

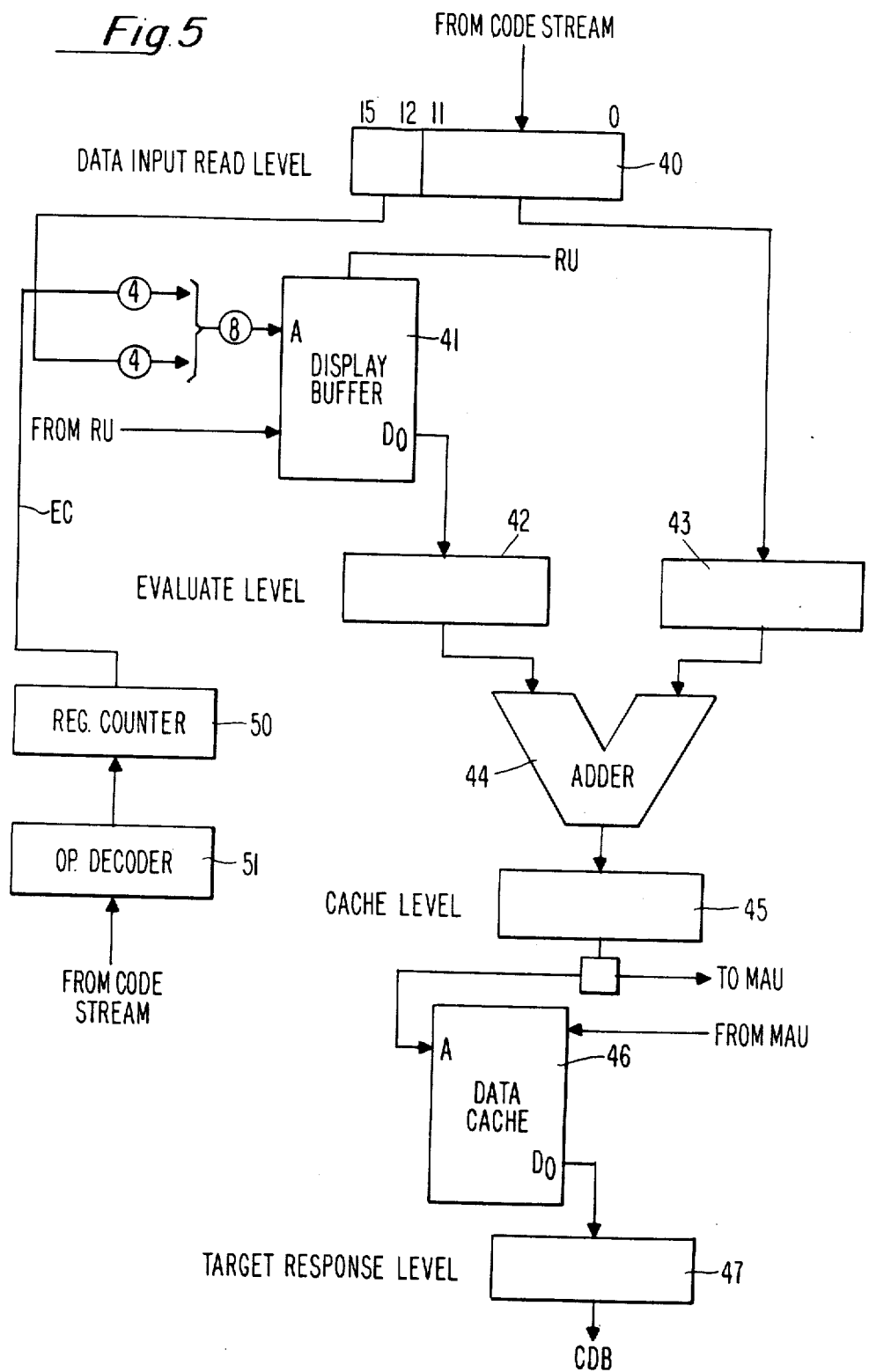

4,704,679

ADDRESSING ENVIRONMENT STORAGE FOR ACCESSING A STACK-ORIENTED MEMORY

BACKGROUND OF THE INVENTION

1. Field of Invention

This invention relates to an addressing environment storage and more particularly to such a storage employed in accessing data items arranged in pushdown stacks which are stored in a computer memory.

2. Description of the Prior Art

Most computer systems made to this day are of the conventional von Neumann organization which has remained relatively unstructured with the objective of being "general purpose". However, over the past two decades, better understanding has been achieved in the exploitation of the potential of block-structured programming languages tat represent complex algorithms. Block structuring of algorithms, i.e., nested declarations, is a natural form for the expression of such complex algorithms.

A particular computer system that was desigred to employ such block-structured, or nested languages, (and also nested data structures) is described in the Barton, et al., U.S. Pat. Nos. 3,461,434; 3,546,677 and 3,548,384. These patents escribe a stack-oriented data processor where the stack mechanism, a first-in last-cut mechanism, handles the flow of operators and associated parameters in a manner which reflects the nested structure of particular higher level languages that are designed to handle natural forms for the expression of complex algorithms. Such languages include ALGOL and ALGOL type languages, such as PL/1, EULER, and so forth, which are based on the block-structuring of algorithms, i.e., nested declarations. While this may appear to impose unnecessary constraints on system development, the resulting products, measured in terms of throughput and flexibility, suggest that design "constraints" may really have been design opportunities (Cf., E. I. Organick, *Computer System Organization*, Academic Press 1973).

A system of the type described in the above-identified Barton patents is oriented around the concept of a segmented memory and specially treated segments called stacks. The processor runs in an expression stack; operators take their arguments from the top of the stack and leave their results on the top of the stack. The data addressing space of the executing program is mapped into the stack as well as other stacks linked to it and data seents referenced by descriptors contained in the stack structure.

The addressing environment of the executing code stream consists of a set of local addressing spaces contained within the stacks. These are called activation records or lexical regions and each consists of a set of variables addressed by an index relative to the base of the activation record. That is to say, addressing of a given data item is by way of an address couple of the form (Lambda, Delta), where Lambda is lexical level of a given activation record in the stack and Delta is the offset to the variable from the base of the activation record at level Lambda. In order to access any activation record within a stack, the respective records, or lexical regions, are linked together by pointers from the base of the topmost activation record to the lowest level activation record. In the above-described Barton patents, addressing is optimized by defining an array of "display" registers maintained in such a manner that element i in the array contains the base of the activation record at level i. This allows quicker access to any of the display values or addresses to the base of any particular activation record and is much quicker than evaluating links by following links from the top activation record down to activation record i.

Activation records are created by executing a procedure entry operator and deleted by executing a procedure exit operator. Both operators may cause a change in the addresses of the various activation records and thus require that the display buffer be updated, which may take a non-trivial amount of time to do.

It is then, an object of the present invention to provide an improved address environment mechanism for addressing various variables stored in stacks in a computer memory, by maintaining multiple sets of display registers.

It is still another object of the present invention to provide such an addressing environment mechanism where changes in the make-up of a given stack may be made and a set of display registers updated without taking an inordinate amount of time.

It is still a further object of the present invention to provide such an addressing environment mechanism where a deleted set of display registers may be reused at a future time with the absolute minimum of evaluation necessary.

SUMMARY OF THE INVENTION

In order to achieve the above-identified objects, the present invention resides in a stack-oriented data processor that employs a plurality of sets of display registers so that the current set of registers does not have to be updated each time the processor moves to a different area of data in the memory, which data is arranged in push-down stacks. In this manner, the programmer only needs to provide a designation of a lexical level in a particular stack and the offset value from the base of a particular activation record in that stack for addition to obtain the actual memory address. The current set of display registers does not have to be updated when either the position or the lexical level of the topmost activation record in the current set is changed. A new set of displays may be created. In this case, the base of the topmost activation record is calculated and the remaining lower activation record bases are copied from the previous set of bases in the display buffer.

A feature then of the present invention resides in a stack-oriented data processor for accessing data arranged as pushdown stacks in main memory which processor has a plurality of sets of display registers, each of which contains a lexical level of base of a particular activation record in a particular stack so that a plurality of different stacks may be accessed by the processor without time-consuming updates of the display registers.

BRIEF DESCRIPTION OF THE DRAWINGS

The above and other objects, advantages and features of the present invention will become more apparent from a review of the following specification when taken in conjunction with the drawings wherein:

FIG. 5 is a schematic diagram of a portion of the reference unit of FIG. 4 illustrating the structure of the present invention.

GENERAL DESCRIPTION OF THE INVENTION

Figure 1:
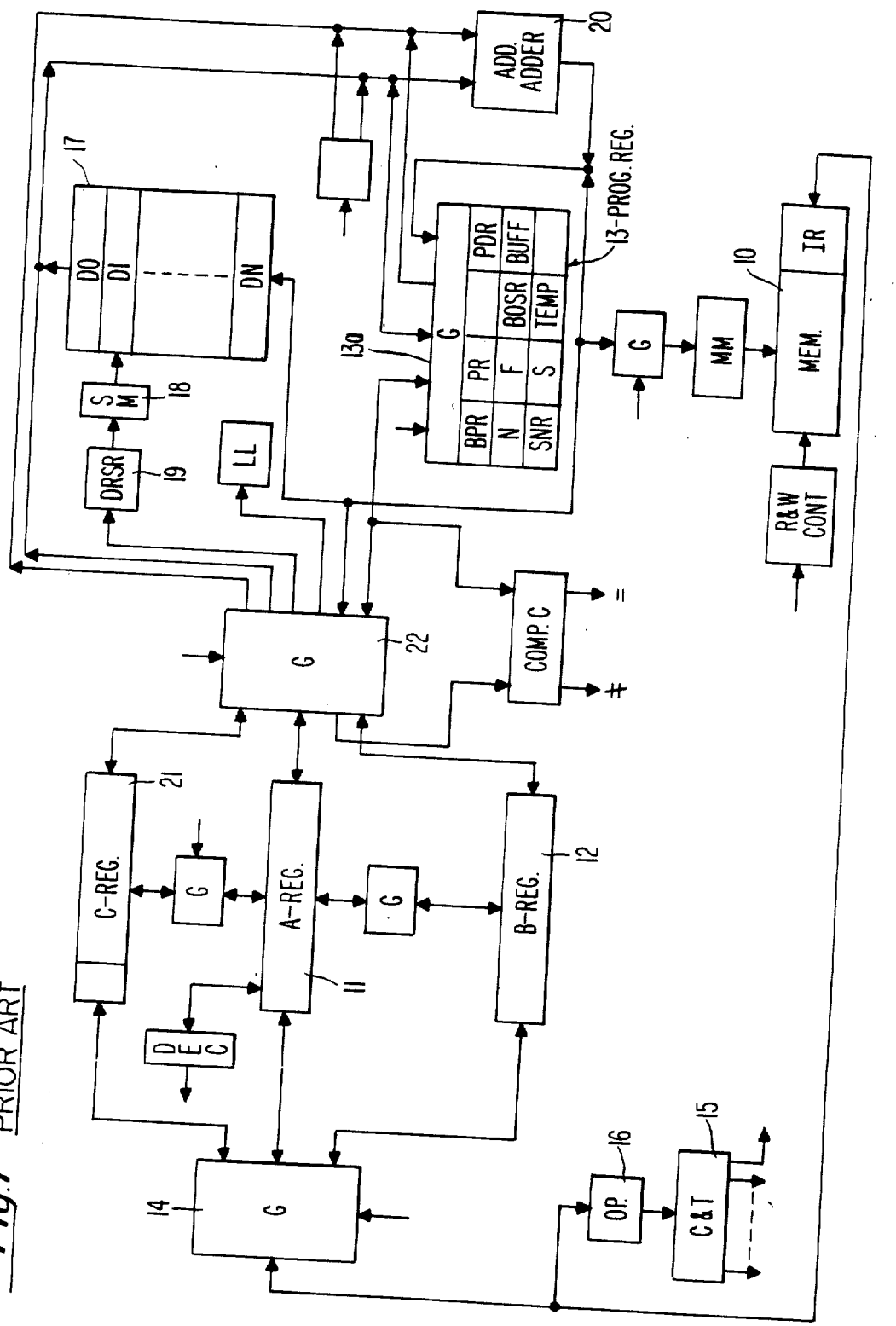
FIG. 1 is a schematic diagram of a prior art stack-oriented data processor.

The processor of the type described in the above-referenced Barton patents is illustrated in FIG. 1. This processor is stack-oriented and the function of the stack mechanism, a first-in last-out mechanism, is to handle the flow of operators and associated parameters in a manner which reflects the nested structure of a particular higher-level language. In FIG. 1, the stack mechanism includes A register 11 and B register 12 together with a group of storage locations in memory 10. F and S registers in the group of program registers 13 store addresses for memory locations in memory 11 and are used in keeping track of the memory locations being used as a stack. A and B registers 11 and 12 respectively form the top two storage locations of the stack and are time-shared between information stacks. Information is put into A register 11 and transferred down to B register 12, then transferred to the corresponding storage locations of the respective stacks in memory 10 by gate 14 under control of a control and timing unit 15 upon execution of an operator in operator register 16. Information is brought back out of a stack in a reverse order and taken out of the top of the current stack from A register 11. The information in the rest of that stack is effectively pushed up one position by appropriately changing the content of the S register contained in the group of program registers 13. The contents of S register point to the top of the current stack.

The processor of FIG. 1 also includes a group of display registers 17 which are referenced by the symbols D0, ..., DN. Each of the display registers 17 contain an absolute address of a memory location in memory 10 which absolute address references a lexical level or base of a particular activation record in the stack currently being addressed.

Associated with display registers 17 is a selection matrix 18 and a display register selection register (DRSR) 19. The lexical level value is stored in the DRSR register and designates a particular display register. The selection matrix 18 is responsive to a lexical level value contained in register 19 to provide a signal causing the content of the corresponding display register to be read out of one of the group of display registers 17. Address adder 20 is provided to create the sum of the contents of one of the display registers 17 and a displacement value selected from A register 11, B register 12 or C register 21 to form an absolute memory address to thus access any location in any one of the corresponding blocks of storage in a particular stack. The reader is referred to the above-referenced Barton et al. patents for a more detailed description of this prior art stack-oriented processor.

Figure 2A:
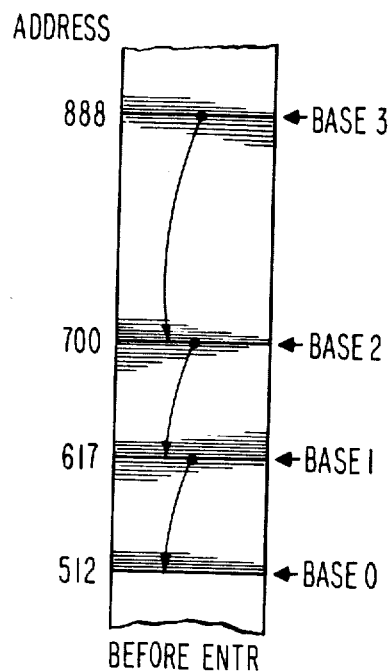
FIGS. 2a–d are diagrams representing a portion of memory containing data arranged as a push-down stack and also the plurality of display registers within the processor which are used to access various data elements within that stack, as described in the prior art.

A data stack as might exist in memory 10 of FIG. 1 is illustrated in FIG. 2a and consists of four activation records at lexical levels 0–3, where the value of the topmost lexical level is stored in register LL of FIG. 1.

Figure 2C:
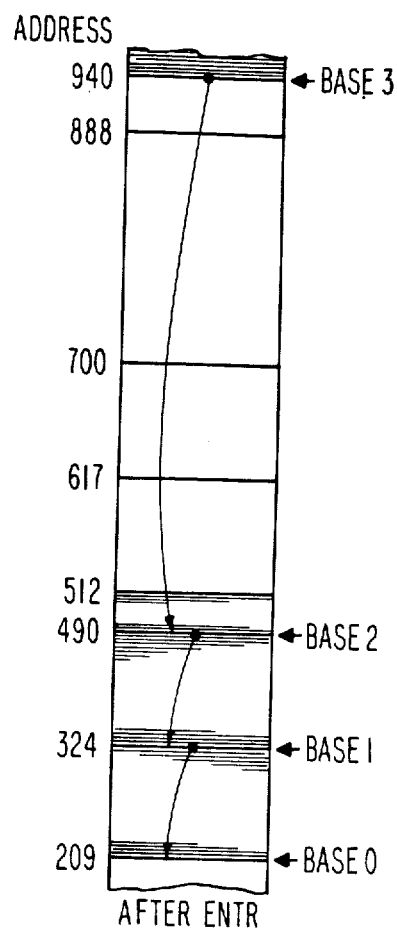
Figure 2B:
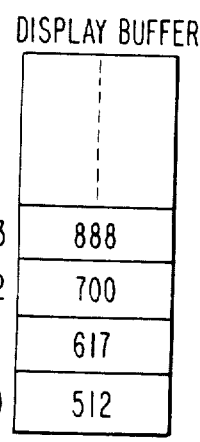

The actual addresses in memory of the respective bases of the activation records are shown in FIG. 2a and these respective addresses are stored in display registers 17 of FIG. 1 in a manner illustrated in FIG. 2b. The order of lexical levels in FIG. 2b are inverse to that of display registers 17 in FIG. 1 for the purpose of easier correspondence between FIG. 2b and FIG. 2a.

Figure 2D:
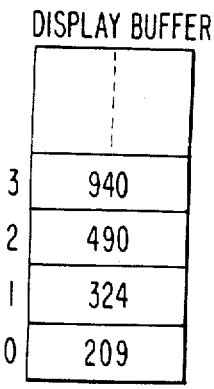

As was indicated above, activation records are created by the execution of a procedure entry operator by the processor. Thus, for the purposes of illustration, FIG. 2c illustrates that the processor is now working in a different stack or portion of memory. As a result, the display registers of FIG. 1 have had to be updated and this update is shown by the new contents of the display registers as shown in FIG. 2d.

Figures 3A, 3B:
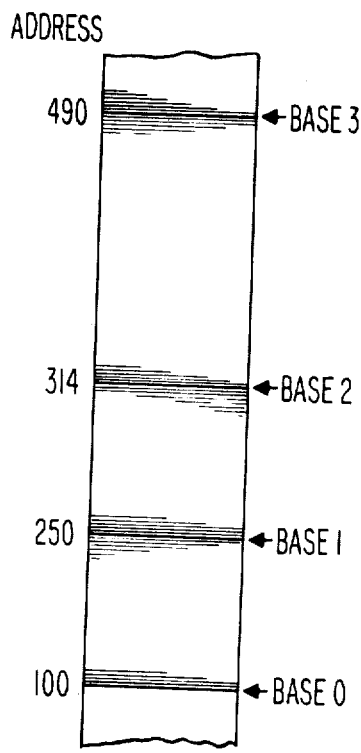
FIGS. 3a and b are diagrams of similar data elements arranged as a push-down stack in main memory and also the plurality of sets of display registers in the processor of the resent invention.

While the employment of a set of display registers provides the benefit of fast access to items in the given data stack, this benefit can be immensely overshadowed by the updating of the display register values to reflect changes in the addressing environment being employed by the processor. As illustrated in FIGS. 3a and b, the present invention employs a number of different sets of display registers. At any one time, however, only one set of display registers is visible. That set is indicated by pointer EC to the current set of displays as illustrated in FIG. 3b. When there is a change in addressing environment, the pointer may be changed to make another set of displays visible to the processor.

DETAILED DESCRIPTION OF THE INVENTION

Figure 4:
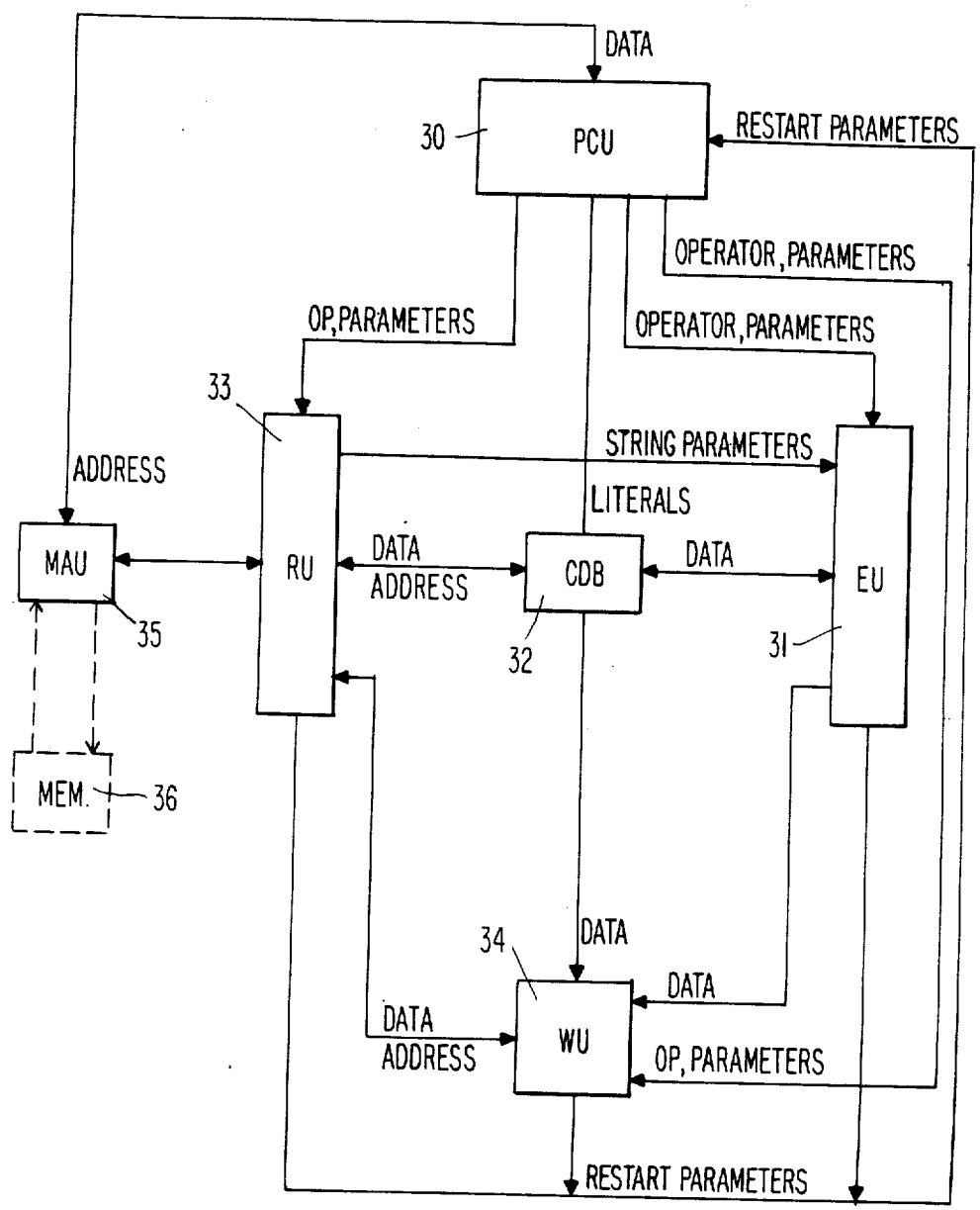
FIG. 4 is a block diagram illustrating a processor employing the present invention.

A general purpose processor employing the present invention is illustrated in FIG. 4. It is distinct from the prior processor illustrated in FIG. 1 which is of a sequential nature. The processor of FIG. 4 is of a parallel or concurrent nature with a number of different units operating simultaneously. The processor of FIG. 4 includes a program scanner or program control unit 30 which receives strings of code from memory 36 by way of memory addressing unit 35 and supplies operators and parameters to execution unit 31, reference unit 33 and write unit 34 and also data or literal values to central data buffer 32 which can be accessed by both execution unit 31 and reference unit 33.

Reference unit 33 of FIG. 4 computes absolute memory addresses from address couples that are received in the code stream from program control unit 30 of FIG. 4. A portion of reference unit 33 which does this computation is illustrated in FIG. 5. Display buffer 41 contains fifteen sets of sixteen display registers each for the purposes that were described in relation to FIG. 3b. These sets of display registers are loaded with the respective addresses of different base locations of particular activation records whose addresses are received from other portions of the reference unit as the activation records are being created. The address couples are received from the program control unit by register 40 which is sixteen bits wide. The four most significant bits are used to specify an activation record or lexical region while the least significant twelve bits contain the displacement or offset within the activation record from that base address. The particular set of display registers currently being used is selected by pointer EC received from register counter 50 of the reference unit when the reference unit encounters a procedure entry operator or a procedure exit operator from the program control unit 30 of FIG. 4. Register counter 50 can be incremented upwardly or downwardly or set equal to zero.

The four-bit EC signals and the four-bit lexical region designation signals address one of the display registers in display buffer 41 with the selected address of the activation record that was selected being transferred to base register 42 while the displacement value from register 40 is transferred to index register 43. These two values are then added together by address adder 44 with the sum being transferred to adder output register 45. This register addresses the data cache 46 and selects a particular item to be loaded into register 47. This register then loads the control data buffer 32 of FIG. 4 and makes the item available for use by other units in the processor. If the data item is not in cache 46, the adder output is sent to memory address unit (MAU) 35 of FIG. 4. Cache 46 is loaded from the MAU.

In at least in one sense, the entire memory of the data processing system may be thought of as a single global stack, or block, with other stacks, or blocks, nested in it down to any level. Any particular stack may be deleted or increased, which required prior art display registers in such an environment to be updated. With the present invention, the creation of a stack, or the change in a stack, can be accomplished by merely moving the display pointer EC to another set of display registers which renders the previous stack invisible to the processor. Also such a stack can be considered as deleted from memory when a procedure exit operator is executed, again, by moving the display pointer EC to another set of display registers. When a procedure exit operator is executed, the contents of the corresonding set of display registers can be deleted without requiring the calculations needed for display register update.

For example, referring again to FIG. 3b, the processor is currently operating in a data stack in memory, such as illustrated in FIG. 3a. The corresponding display set (set 1) is pointed to by pointer EC. If a procedure entry operator is encountered, changing or enlarging that data stack, display pointer EC is merely shifted to set 2 of the display registers. It will be understood that FIG. 3a merely represents a segment of storage locations in memory and is actually extended downwardly to storage location O and upwardly to the limit of memory.

The uniqueness of this invention centers around deciding whether a particular procedure entry operator benefits most from updating the current set of display registers or creating a new set. Creating a new set also requires deciding whether to calculate all but the top display or copy them from the previous set. When a new set has been created, the subsequent procedure exit operator benefits immensely, since the current set of displays is simply "thrown away" by decrementing EC by 1. No display update is necessary. Also, by carefully monitoring the stacks on which the processor is running, the most recently deleted set of display registers (deleted by an exit operator) may contain the values (except for the topmost display) that the next enter operator will attempt to create. In this case, only the topmost display is calculated, and EC is incremented by 1 to point to this set. Prior art processors would have had to update all displays.

EPILOGUE

An address environment storage unit for a stack-oriented data processor has been described for operating in data sets arranged as structured blocks, or nested pushdown stacks. The address environment storage employs a plurality of sets of display registers such that the current set of display registers does not have to be updated each time the processor moves to a different area of data in memory. In this manner, the programmer only needs to provide a designation of a lexical level in a particular stack and the offset value from the base of the particular activation record in that stack for addition to obtain actual memory address. When the processor executes a procedure enter operator that calls for a new section of memory in which to operate, the display pointer is merely changed to point to the set of display registers provided for accessing that new area of memory without any loss of time such as would be required in prior art stack-oriented processors.

While but one embodiment of the present invention has been disclosed, it will be apparent to those skilled in the art that variations and modifications may be made therein without departing from the spirit and scope of the invention as claimed.

What is claimed is:

1. A memory enviroment unit coupled to a memory for forming absolute memory addresses to access data items arranged in said memory as a series of records, which data items are specified by an address couple consisting of a record indication and an offset value representing the displacement of the data item form the base memory location of that record, said unit comprising:

a plurality of sets of record base address registers, each register containing an address of a record base memory location, each set of record has address registers representing a particular memory adress enviroment;

a pointer register coupled to each of said registers and containing a value indicating a particular set in the memory adress enviroment to be currently adressed, said value representing part of an address to a record base address register, said record indication serving to complete said an address of said a record base register; and an input register to receive saod address couple, said input register being coupled to said registers to supply said record indication as the remaining part of said an address to one of said record base address registers.

2. A memory address enviroment unit according to claim 1 further including:

adder means coupled to each of said record base address registers and to said input register to respectively receive a record base address and a displacement value for addition to create an absolute memory address.

3. A memory address environment unit according to claim 2 further including:

an adder output register coupled to said adder means to receive said absolute memory address, said adder output register being coupled to said memory to access the particular addressed data item.

4. A memory address environment unit according to claim 3 further including:

data cache means, to store previously fetched data items from said memory, said data cache means being coupled to said adder output register to receive said absolute memory address should the particular addressed data item be in said data cache means.

5. A memory address enviroment unit according to claim 1 wherein:

said pointer register is a counter register to be incremented and decremented, its current value serving as a part of an address to one of said record base address registers.

6. A memory address enviroment unit according to claim 5 further including:
an operator decorder coupled to said pointer register to increment or decrement its value in response to an operator.

* * * * *